United States Patent
Seko et al.

(10) Patent No.: US 7,744,942 B2
(45) Date of Patent: Jun. 29, 2010

(54) THICKENING COMPOSITION HAVING IMPROVED VISCOSITY-EMERGING PROPERTY

(75) Inventors: Yoshinori Seko, Yokkaichi (JP); Tomohiro Kimura, Yokkaichi (JP); Shuji Nishikawa, Yokkaichi (JP)

(73) Assignee: Taiyo Kagaku Co., Ltd., Yokkaichi-shi Mie (JP)

( * ) Notice: Subject to any disclaimer, the term of this patent is extended or adjusted under 35 U.S.C. 154(b) by 780 days.

(21) Appl. No.: 10/577,301

(22) PCT Filed: Mar. 8, 2006

(86) PCT No.: PCT/JP2006/304436

§ 371 (c)(1),
(2), (4) Date: Apr. 28, 2006

(87) PCT Pub. No.: WO2006/095756

PCT Pub. Date: Sep. 14, 2006

(65) Prior Publication Data

US 2008/0280022 A1   Nov. 13, 2008

(30) Foreign Application Priority Data

Mar. 11, 2005   (JP) .............................. 2005-069114

(51) Int. Cl.
*A23L 1/05* (2006.01)
*A23L 1/06* (2006.01)
*A23L 1/00* (2006.01)

(52) U.S. Cl. ...................................... 426/573; 426/290

(58) Field of Classification Search ................ 426/654, 426/573, 589, 576, 578, 579, 285, 290
See application file for complete search history.

(56) References Cited

U.S. PATENT DOCUMENTS 4,487,866 A * 12/1984 Almond et al. ............... 524/42
5,633,030 A * 5/1997 Marrs et al. .................. 426/573
6,270,830 B1  8/2001 Kamada et al.
2003/0124195 A1  7/2003 Delprato et al.
2006/0078526 A1  4/2006 Boyd

FOREIGN PATENT DOCUMENTS

| EP | 0937410 | 8/1999 |
|---|---|---|
| JP | 58-198556 A | 11/1983 |
| JP | 61-21492 B2 | 5/1986 |
| JP | 63-024865 A | 2/1988 |
| JP | 2-299556 A | 12/1990 |
| JP | 05-92918 A | 4/1993 |
| JP | 07-322832 A | 12/1995 |
| JP | 10-108633 A | 4/1998 |
| JP | 10-204408 A | 8/1998 |
| JP | 2000-270792 A | 10/2000 |
| JP | 3186737 B2 | 5/2001 |
| JP | 2001-172395 A | 6/2001 |
| JP | 2001-275584 A | 10/2001 |
| JP | 2003-104912 A | 4/2003 |
| JP | 2003-259838 A | 9/2003 |
| JP | 2004-147567 A | 5/2004 |
| JP | 2005-333885 A | 12/2005 |
| JP | 2006-271258 A | 10/2006 |
| KR | 2000-0052639 A | 8/2000 |
| WO | WO-98/17126 A1 | 4/1998 |
| WO | WO-2004/096906 | 11/2004 |

OTHER PUBLICATIONS

English Translation of Japanese Patent JP1998-10204408, Aug. 1998, Takenawa.*
Russian Office Action dated Nov. 2, 2009 and English Translation.

* cited by examiner

*Primary Examiner*—Keith Hendricks
*Assistant Examiner*—Andrew Krause
(74) *Attorney, Agent, or Firm*—Birch, Stewart, Kolasch & Birch, LLP.

(57) ABSTRACT

A thickening composition characterized in that the thickening composition comprises a xanthan gum in which a potassium salt is attached to a powder surface of the xanthan gum.

9 Claims, 1 Drawing Sheet

[Figure 1]
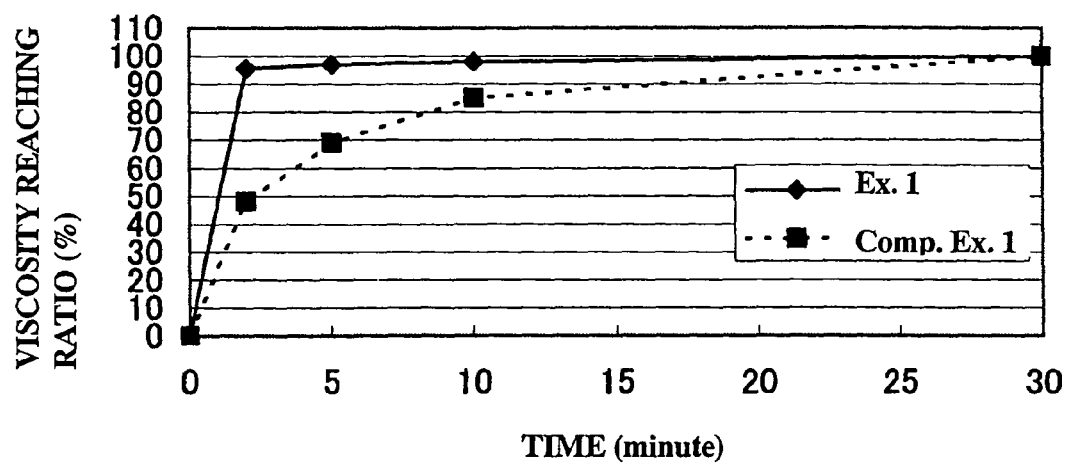

THICKENING COMPOSITION HAVING IMPROVED VISCOSITY-EMERGING PROPERTY

TECHNICAL FIELD

The present invention relates to a thickening composition in which viscosity conveniently emerges by adding the composition to a desired product containing water, and the present invention particularly relates to a thickening composition having an improved viscosity-emerging property, which is suitable for food applications for conveniently thickening refreshing beverage, gravy sauce, sauce, salad dressing, soup, mousse, jelly or the like, or applications in which viscosity emerges by adding the composition in a small amount to a diet or the like of a patient is experiencing difficulty in chewing and swallowing due to eating disorder.

BACKGROUND ART

A xanthan gum is soluble in cold water, and a solution obtained shows a high pseudo-plastic viscosity. This solution is considered to form a weak, gel-like network, so that the solution is very excellent in dispersion or emulsification stability of an insoluble solid content or a fat or oil at a relatively low viscosity. In addition, the solution is excellent in heat resistance, acid resistance and freezing resistance. Since various resistances are high, the xanthan gum has been used in various fields such as foods, cosmetics and chemicals.

In order to effectively use a xanthan gum, it is necessary that the xanthan gum is completely hydrated at first, and the viscosity emerges for the first time upon the complete hydration. When a general consumer or the like uses a xanthan gum in a food or the like, the xanthan gum is likely to be in a state of a so-called "lumpy mass," wherein only a surface of the xanthan gum is dissolved, while its internal remains in a powder state. A xanthan gum in a lumpy mass is incomplete in hydration, so that the xanthan gum is likely to be in a state that cannot exhibit its function.

When the xanthan gum is hydrated, the viscosity-emerging rate has a tendency of being fast as the particle size of the xanthan gum is finer, and being slow as the particle size is larger. In addition, the xanthan gum having a finer particle size has a larger surface area, thereby giving a property of more easily being formed into a lumpy mass when dispersed in water. Therefore, in order to completely hydrate the xanthan gum, an equipment or the like for dispersing or dissolving would be necessitated. As described above, ensuring the dispersion or dissolution of the xanthan gum would be attended with difficulties.

Usually, as a technique of dispersing or dissolving a xanthan gum in water, there has been known a technique comprising dispersing a xanthan gum in ethanol, and dispersing or dissolving the dispersion in a desired product such as water; or a process comprising strongly agitating a xanthan gum with an agitation or dissolving apparatus such as DISPER to dissolve without forming a lumpy mass. This is an industrially employable process, so that not only a certain level of skill is necessary, it is difficult to carry out in an environment such as households without such equipments.

In addition, there has also been published a technique of improving dissolubility, comprising forming a water-soluble polysaccharide into granules using an emulsifying agent as a binder solution (for example, Patent Publication 1). However, a lumpy mass is generated depending upon the supplying method, and the xanthan gum cannot necessarily be easily dissolved, so that there has been earnestly desired a composition that even more easily disperses or dissolves to quickly give a desired viscosity.

Patent Publication 1: Japanese Patent Gazette No. 3186737

DISCLOSURE OF THE INVENTION

Problems to be Solved by the Invention

Therefore, a composition that does not form into a lumpy mass as in a conventional powder, in which a desired viscosity quickly emerges has been in demand. Especially, as a xanthan gum for giving viscosity to a nursing diet or training diet for an individual experiencing difficulty in chewing and swallowing, the properties as described above are strongly desired. An object of the present invention is to provide a thickening composition in which viscosity quickly emerges by adding a small amount of the composition to a desired product containing water, whereby the operating time of a consumer can be remarkably shortened.

Means to Solve the Problems

In view of the above circumstances, as a result of intensive studies on an improvement in viscosity-emerging property and dissolubility of a xanthan gum, the present inventors have remarked on the feature that the dissolution is controlled by a salt concentration in a case where a xanthan gum is dissolved, i.e. the dissolution is controlled by attaching a potassium salt to a surface of a xanthan gum, for example, spraying a potassium chloride solution to the surface of a xanthan gum and drying, thereby modifying the surface to control the dissolution only on the surface, whereby the present inventors have found that dispersibility of the xanthan gum into water is remarkably improved, and that the water-dispersed xanthan gum shows that viscosity quickly emerges. In this phenomenon, it is essential that a potassium salt is attached to a surface of a xanthan gum, and an effect of improving viscosity-emerging property is not found in the step of powder-blending a xanthan gum with a potassium salt powder.

Effects of the Invention

Since a potassium salt is attached to a powder surface of a xanthan gum, water wettability of the surface of the xanthan gum is improved, so that its dispersibility into water is remarkably improved, whereby a reaching rate to a peak viscosity can be also remarkably improved.

BEST MODE FOR CARRYING OUT THE INVENTION

In the present invention, a xanthan gum and a potassium salt, which have been approved as food additives, are used.

The xanthan gum in the present invention refers to a natural gum prepared by fermenting glucose or the like with a microorganism *Xanthomonas campestris*, purifying a polysaccharide accumulated outside the cell body, and powdering the purified product.

The potassium salt in the present invention is not particularly limited, as long as the potassium salt refers to those generally used in a food, including one or more members selected from the group consisting of potassium chloride, monopotassium citrate, tripotassium citrate, potassium DL-hydrogentartrate, potassium L-hydrogentartrate, potassium carbonate, tetrapotassium pyrophosphate, potassium polyphosphate, potassium metaphosphate, tripotassium phosphate, dipotassium hydrogenphosphate, and potassium dihydrogenphosphate, and potassium chloride is preferable from the viewpoint of further improving dissolubility.

The attachment in the present invention refers to an attachment state of the particle of the potassium salt to the particle surface of the xanthan gum, including an attachment state of a particle where a potassium in a crystalline state is attached to a particle surface of a xanthan gum, i.e. a state where a potassium salt serving as a binder or a coating agent is attached to a surface of a xanthan gum. Specifically, it is a state where the attachment of the particle is maintained even when subjected to a 30-second vibration on a 60-mesh sieve. The fine powder crushed by vibration that passes through the 60-mesh sieve is preferably 20% by weight or less, more preferably 15% by weight or less, and even more preferably 10% by weight or less, Here, the particle size of the powder of a general xanthan gum or potassium chloride is finer than 60 mesh. Therefore, when a powder obtained by simply mixing the powders of xanthan gum and potassium chloride is sieved with a 60-mesh sieve, 100% of the powders theoretically pass through the sieve.

The method of attachment is not particularly limited, and includes a method comprising wetting a xanthan gum and a potassium salt particle, thereby attaching the potassium salt particle to the xanthan gum, and drying the attached particle; a method comprising evenly spraying a potassium salt solution to a xanthan gum powder, and drying the sprayed xanthan gum; and the like. A method comprising spraying a potassium salt solution to a xanthan gum, and thereafter fluidized drying the sprayed xanthan gum is preferable from the viewpoint of being able to attach the potassium salt to the particle surface of the xanthan gum, and to evenly attach the potassium salt to the xanthan gum. The method of fluidized drying is not particularly limited, and it is desired that the fluidized drying is carried out after a 1 to 10% by weight aqueous potassium chloride is sprayed as a binder. The amount of the potassium salt attached is such that the potassium salt is attached to the xanthan gum in an amount of preferably 0.5 parts by weight or more and 7 parts by weight or less, and more preferably 1 part by weight or more and 7 parts by weight or less, based on 100 parts by weight of the xanthan gum. When the amount of the potassium salt exceeds 7 parts by weight, the hygroscopicity of the particle increases, so that the emergence of viscosity is undesirably delayed. When the amount is less than 0.5 parts by weight, the amount of the potassium salt attached is small, so that the emergence of viscosity is undesirably not accelerated.

The peak viscosity in the present invention is a numerical value for a viscosity emerging when a xanthan gum is dispersed or dissolved in an ideal state. Specifically, when a certain amount of a xanthan gum is dispersed or dissolved in a certain amount of water, there is a tendency of elevating a viscosity with the passage of time from immediately after introducing the xanthan gum into water, but this elevation tendency is not found after the passage of a certain period of time. The viscosity at that time is referred to as a peak viscosity. For example, when 1 g of a xanthan gum is added to 99 g of water at 20° C., and the mixture is stirred for a certain period of time (30 seconds, 600 r/min) and thereafter allowed to stand, the viscosity begins to elevate, and becomes stable at a certain viscosity at the passage of 30 minutes or so. This viscosity is called a peak viscosity. In the present invention, when the potassium salt-attached xanthan gum is used, the time period necessary to reach 90% or more of a peak viscosity is within 2 minutes after adding, thereby remarkably shortening the operating time when a consumer actually prepares a thickening agent by hand-stirring, as compared to a granular xanthan gum not subjected to a surface treatment in which a time period necessary to reach a peak viscosity of 90% or more is 10 minutes or more. In addition, when the potassium salt-attached xanthan gum is compared to a granular xanthan gum not subjected to a surface treatment, the xanthan gum is dispersed or dissolved without forming into a lumpy mass, thereby making it possible to really experience the fact that viscosity quickly emerges.

The thickening composition of the present invention is not particularly limited as long as a modified xanthan gum to which a potassium salt is attached is contained. For example, one or more members selected from the group consisting of guar gum, enzymatically decomposed guar gum, carrageenan, karaya gum, CMC sodium, sodium alginate, processed starch and dextrin can be used. The dextrin to be used is not particularly limited, and those having DE (Dextrose Equivalent) of from 6 to 30 are preferable, and those having DE of from 6 to 25 are more preferable, from the viewpoint of dispersibility.

The present invention will be specifically described hereinbelow by the Examples, without intending to limit the scope of the present invention thereto.

EXAMPLE 1

<Preparation of Binder Solution>

Five grams of potassium chloride was dissolved in 95 g of ion-exchanged water at 50° C. while stirring.

<Spraying Step>

One-hundred grams of a xanthan gum was adjusted to a fluid state, and 50 g of a potassium chloride solution was sprayed thereto. After the termination of spraying, the resulting granules were fluidized and dried, to give 94.3 g of a xanthan gum composition. One level 100-ml vessel-ful of the composition was filled, and the weight of the filled granules was determined. The weight of the granules was 41 g, and a bulk density was 0.41 g/ml. In addition, the degree of attachment of the granules was confirmed by vibrating 20 g of the resulting granules on a 60-mesh JIS standard sieve having an inner diameter of 150 mm for 30 seconds (Model OCTAGON 200, manufactured by K. K. Iida Seisakusho, vibration width: 2 to 3 mm, 3600 counts/min). As a result, the 60-mesh passed powder was 2.04 g out of 20 g, and the proportion of the xanthan gum having a low degree of attachment to potassium chloride was 10.2% by weight. Therefore, it was confirmed that the balance 89.8% by weight was attached. On the other hand, the potassium content of 100 g each of the granules after fluidized drying, the granules remaining on the 60-mesh sieve, and the 60-mesh passed powder was determined according to atomic absorption spectroscopy. As a result, the potassium is contained in an amount of 1600 mg in the granules after fluidized drying, 1600 mg in the granules remaining on the 60-mesh sieve, and 1600 mg in the 60-mesh passed powder. Therefore it was confirmed that the potassium was evenly attached in the above-mentioned xanthan gum composition.

COMPARATIVE EXAMPLE 1

A comparative product was prepared under the same conditions as in Example 1, replacing the potassium chloride solution with ion-exchanged water.

<Spraying Step>

One-hundred grams of a xanthan gum and 2.5 g of the potassium chloride powder, which was the same amount of potassium chloride as that in Example 1, were adjusted to a fluid state, and 50 g of ion-exchanged water was sprayed thereto. After the termination of spraying, the resulting granules were fluidized and dried, to give 92 g of a xanthan gum composition. One level 100-ml vessel-full of the composition was filled, and the weight of the filled granules was determined. The weight of the granules was 45 g, and a bulk density was 0.45 g/ml. In addition, the degree of attachment of the granules was confirmed in the same manner as in Example 1 for 20 g of the resulting granules. As a result, the 60-mesh passed powder was 4.18 g out of 20 g, and the proportion of the xanthan gum having a low degree of attachment to potassium chloride was 20.9% by weight. On the other hand, the potassium content of 100 g each of the granules after fluidized drying, the granules remaining on the 60-mesh sieve, and the 60-mesh passed powder was determined according to the atomic absorption spectroscopy in the same manner as in Example 1. As a result, the potassium is contained in an amount of 1600 mg in the granules after fluidized drying, 1400 mg in the granules remaining on the 60-mesh sieve, and 2500 mg in the 60-mesh passed powder. Therefore, it was confirmed that since the potassium was not evenly attached in the above-mentioned xanthan gum composition, potassium chloride weakly attaching exceedingly passed through the 60-mesh sieve.

TEST EXAMPLE 1

One gram of the granules obtained in each of Example 1 and Comparative Example 1 was supplied at once to 99 g of ion-exchanged water at 20° C. stirring at 600 r/min using LOW-ROTATION DISPER (manufactured by TOKUSHU KIKA KOGYO CO., LTD.), and the mixture was continued stirring for 30 seconds. Thereafter, the mixture was allowed to stand, and its viscosities at points of 2 minutes passed, 5 minutes passed, 10 minutes passed, and 30 minutes passed were determined with a B-type viscometer (manufactured by Tokyo Keiki Co., Ltd.; rotation speed: 12 r/min, after 30 seconds; No. 3 rotor). The determination result was expressed as a percentage of the viscosity reaching ratio of:

"(determination result)÷(viscosity after 30 minutes)× 100,"

wherein the determination result of viscosity after 30 minutes is defined as 100%. The determination results for Example 1 and Comparative Example 1 are shown in Table 1, and the viscosity reaching ratio is shown in FIG. 1.

TABLE 1

|  | Time (minute) | | | | |
| --- | --- | --- | --- | --- | --- |
|  | 0 | 2 | 5 | 10 | 30 |
| Example 1 | 0 | 95.6 | 96.9 | 98 | 100 |
| Comparative Example 1 | 0 | 48 | 69 | 85 | 100 |

In Example 1, the degree of attachment of the xanthan gum and potassium chloride was high, and the proportion in which the powder surface of the xanthan gum was modified was high, so that its dispersibility into water was excellent, and that there was no formation of a lumpy mass even under weak agitation conditions, and thereby the xanthan gum was evenly dispersed or dissolved, whereby viscosity quickly emerged. In Comparative Example 1, the degree of attachment of the xanthan gum and potassium chloride was low, and the proportion in which the powder surface of the xanthan gum was modified was low, so that its dispersibility was worsened, and that a lumpy mass was formed upon stirring to a degree that nearly a peak viscosity was reached after 30 minutes passed.

TEST EXAMPLE 2

Use Embodiment for Foodstuff

French dressing was prepared using the xanthan gum granules prepared in Example 1 in accordance with the formulation shown in Table 2. The viscosity emerged and was stabilized immediately after simply mixing various kinds of raw materials together, and a change in viscosity was not found even after 30 minutes passed.

TABLE 2

| Example 1 | 0.5 |
| --- | --- |
| Vegetable Fat or Oil | 38 |
| Water | 37.5 |
| Granulated Sugar | 12 |
| Vinegar | 9 |
| Table Salt | 1 |
| Powder Garlic | 1 |
| Powder Mustard | 1 |
| Total | 100 |

INDUSTRIAL APPLICABILITY

The present invention is an invention enabling not only remarkable shortening of a time period required for dissolving a xanthan gum, but also the dissolution of the xanthan gum, which conventionally has required skills, without requiring special techniques or equipments at households or the like.

BRIEF DESCRIPTION OF THE DRAWINGS

[FIG. 1] A graph showing a viscosity reaching ratio.

The invention claimed is:

1. A thickening composition comprising;
xanthan gum particles and a potassium salt,
wherein said xanthan gum particles are coated with said potassium salt, wherein when said coated xanthan gum particles are subjected to a 30-second vibration in a 60-mesh JIS standard sieve having an inner diameter of 150 mm at a vibration width of 2 to 3 mm and 3600 counts/min, wherein 20% by weight or less of the coated xanthan gum particles crushed by vibration pass through the sieve, and wherein xanthan gum particles prior to potassium salt coating have a particle size finer than 60 mesh.

2. The thickening composition according to claim 1, wherein the coated xanthan gum particles are prepared by a method comprising the steps of spraying a potassium salt solution onto xanthan gum particles, and thereafter fluidizing and drying the sprayed xanthan gum particles to produce the coated xanthan gum particles.

3. The thickening composition according to claim 1, wherein the potassium salt is coated on the xanthan gum particles, in an amount of 0.5 parts by weight or more and 7 parts by weight or less, based on 100 parts by weight of the xanthan gum particles.

4. The thickening composition according to claim 1, wherein when the coated xanthan gum particles are added to ion-exchanged water in an amount of 1 part by weight based on 99 parts by weight of ion-exchanged water at 20° C., the xanthan gum is dispersed or dissolved without forming a lumpy mass, to reach 90% or more of a peak viscosity at 2 minutes after the addition.

5. A foodstuff comprising the thickening composition according to claim 1.

6. The thickening composition according to claim 1, wherein the coated xanthan gum particles crushed by vibration that pass through the sieve are 15% by weight or less.

7. The thickening composition according to claim 1, wherein the coated xanthan gum particles crushed by vibration that pass through the sieve are 10% by weight or less.

8. The thickening composition according to claim 1, wherein said potassium salt is one or more potassium salt selected from the group consisting of potassium chloride, monopotassium citrate, tripotassium citrate, potassium DL-hydrogentartrate, potassium L-hydrogentartrate, potassium carbonate, tetrapotassium pyrophosphate, potassium polyphosphate, potassium metaphosphate, tripotassium phosphate, dipotassium hydrogenphosphate, and potassium dihydrogenphosphate.

9. The thickening composition according to claim 1, wherein the thickening composition consists essentially of coated xanthan gum particles and the potassium salt is selected from the group consisting of potassium chloride, monopotassium citrate, tripotassium citrate, potassium DL-hydrogentartrate, potassium L-hydrogentartrate, potassium carbonate, tetrapotassium pyrophosphate, potassium polyphosphate, potassium metaphosphate, tripotassium phosphate, dipotassium hydrogenphosphate, and potassium dihydrogenphosphate.

* * * * *